(12) United States Patent
Nealson et al.

(10) Patent No.: US 8,415,037 B2
(45) Date of Patent: Apr. 9, 2013

(54) MICROBIAL FUEL CELLS

(75) Inventors: Kenneth H. Nealson, Los Angeles, CA (US); Massoud Pirbazari, Los Angeles, CA (US); Lewis Hsu, Lomita, CA (US)

(73) Assignee: University of Southern California, Los Angeles, CA (US)

( * ) Notice: Subject to any disclaimer, the term of this patent is extended or adjusted under 35 U.S.C. 154(b) by 55 days.

(21) Appl. No.: 12/114,097

(22) Filed: May 2, 2008

(65) Prior Publication Data

US 2010/0040908 A1  Feb. 18, 2010

Related U.S. Application Data

(60) Provisional application No. 60/915,650, filed on May 2, 2007.

(51) Int. Cl.
*H01M 8/16* (2006.01)

(52) U.S. Cl.
USPC .................................................. 429/2

(58) Field of Classification Search .................. 429/2
See application file for complete search history.

(56) References Cited

U.S. PATENT DOCUMENTS

| | | | |
|---|---|---|---|
| 5,976,719 A * | 11/1999 | Kim et al. ............ | 429/2 |
| 6,913,854 B1 | 7/2005 | Alberte et al. | |
| 7,160,637 B2 | 1/2007 | Chiao et al. | |
| 2005/0095466 A1 | 5/2005 | Minteer et al. | |
| 2006/0011491 A1 | 1/2006 | Logan et al. | |
| 2006/0234110 A1 | 10/2006 | Bergel et al. | |
| 2008/0090736 A1 | 4/2008 | Zhao et al. | |
| 2008/0213632 A1 | 9/2008 | Noguera et al. | |
| 2010/0196742 A1 | 8/2010 | Nealson et al. | |
| 2011/0183159 A1 | 7/2011 | He et al. | |
| 2011/0229775 A1 | 9/2011 | Michaels et al. | |

FOREIGN PATENT DOCUMENTS

| | | |
|---|---|---|
| JP | 56016864 U | 2/1981 |
| WO | 2006099220 A3 | 9/2006 |
| WO | WO2008036347 | 3/2008 |
| WO | WO2008109911 A1 | 9/2008 |
| WO | 2008112371 A3 | 11/2008 |
| WO | WO2006099220 A3 | 6/2009 |
| WO | WO2009009214 A3 | 6/2009 |
| WO | WO2009140428 A1 | 11/2009 |
| WO | 2010088626 A3 | 8/2010 |

OTHER PUBLICATIONS

Zhen et al., "Application of Bacterial Biocathodes in Microbial Fuel Cells", Jul. 2006, Electroanalysis, vol. 18, pp. 2009-2015.*
Goel et al., "Sequential Nitrification and Denitrification in a Divided Cell Attached Growth Bioelectrochemical Reactor", Nov. 2005, Environmental Engineering Science, vol. 22, pp. 440-449.*
Lowe et al., "Aerobic and Anaerobic Reduction of Cr(VI) by *Shewanella oneidensis* Effects of Cationic Metals, Sorbing Agents and Mixed Microbial Cultures", 2003, Acta Biotechnology, vol. 23, pp. 161-178.*

Ringeisen et al., "A miniature microbial fuel cell operating with an aerobic anode chamber", Journal of Power Sources 165 (2007) 591-597.*
Gregory, Kelvin B., et al.; "Remediation and Recovery of Uranium from Contaminated Subsurface Environments with Electrodes;" Environ. Sci. Technol. 2005, 39, pp. 8943-8947.
Logan, Bruce E., et al.; "Microbial Fuel Cells—Challenges and Applications;" Environ. Sci. Technol. 2006, pp. 5172-5180.
Rabaey, Korneel, et al.; "Cathodic Oxygen Reduction Catalyzed by Bacteria in Microbial Fuel Cells;" The ISME Journal, 2008, 2, pp. 519-527.
Rozendal, Rene A., et al.; "Hydrogen Production with a Microbial Biocathode;" Environ. Sci. Technol. 2008, 42, pp. 629-634.
Bullen, R.A., et al.; "Biofuel cells and their development;" Biosensors and Bioelectronics, vol. II, Issue 11, pp. 2015-2045, May 2006.
Rabaey, K. et al.; "Microbial ecology meets electrochemistry: Electricity-driven and driving communities;" The ISME Journal, vol. 1, pp. 9-18, May 2007.
Acar et al. Electrokinetic remediation: Basics and technology status. Journal of Hazardous Materials. 40(2):117-137.
Acar et al., Principles of Electrokinetic Remediation. Environmental Science and Technology. 27(13):2638-2647.
Angenent, L. T.; Karim, K; Al-Dahhan, M.H.; Wreen, B.A.; Domiguez-Espinosa, R. Production of bioenergy and biochemicals from industrial and agricultural wastewater. Trends Biotechnol. 2004, 22, 477-485.
Arias, Y.M. and B.M. Tebo. Cr(VI) reduction by sufidogenic and nonsulfidogenic microbial consortia. Applied and Environmental Microbiology, 2003. 69(3): p. 1847-1853.
Bakermans, C., A.I. Tsapin, V. Souza-Egipsy, D.A. Gilichinsky, and K.H. Nealson. 2003. Reproduction and metabolism at −10° C of bacteria isolated from Siberian permafrost. Environ. Microbio. 5: 321-326.
Bencheikh-Latmani, R., et al. Global Transcriptional Profiling of *Shewanella oneidensis* MR-1 during Cr(VI) and U(VI) Reduction. Appl. Environ. Microbiol., 2005. 71(11): p. 7453-7460.
Bretschger, O., et al. Current production and metal oxide reduction by *Shewanella oneidensis* MR-1 wild type and mutants. Applied and Environmental Microbiology, 2007. 73(21): p. 7003-7012.

(Continued)

*Primary Examiner* — Patrick Ryan
*Assistant Examiner* — Ladan Mohaddes
(74) *Attorney, Agent, or Firm* — Fish & Richardson P.C.

(57) ABSTRACT

A microbial fuel cell includes an anode compartment with an anode and an anode biocatalyst and a cathode compartment with a cathode and a cathode biocatalyst, with a membrane positioned between the anode compartment and the cathode compartment, and an electrical pathway between the anode and the cathode. The anode biocatalyst is capable of catalyzing oxidation of an organic substance, and the cathode biocatalyst is capable of catalyzing reduction of an inorganic substance. The reduced organic substance can form a precipitate, thereby removing the inorganic substance from solution. In some cases, the anode biocatalyst is capable of catalyzing oxidation of an inorganic substance, and the cathode biocatalyst is capable of catalyzing reduction of an organic or inorganic substance.

35 Claims, 7 Drawing Sheets

OTHER PUBLICATIONS

Bretschger, O., et al. Bacterial interactions with solid substrates: Applications for microbial fuel cells, carbonate sufaces and metal oxide reduction. Geochimica Et Cosmochimica Acta, 2007. 71(15): p. A121-A121.

Cao, X., et al. Electricity generation by an enriched phototrophic consortium in a microbial fuel cell. Electrochem. Commun. 2008, 10, 1392-1395.

Camargo, J. A. and A. Alonso, "Ecological and toxicological effects of inorganic nitrogen pollution in aquatic ecosystems: A global assessment," Environment International 32: 831-849 (2006).

Chain, P.; Lamerdin, J.; Larimer, F.; Regala, W.; Lao, V.; Land, M.; Hauser, L.; Hooper, A.; Klotz, M.; Norton, J.; Sayavedra-Soto, L.; Arciero, D.; Hommes, N.; Whittaker, M.; Arp, D. Complete genome sequence of the ammonia-oxidizing bacterium and obligate chemolithoautotroph *Nitrosomonas europaea*. J. Bacteriol. 2003, 185, 2759-2773.

Chen, F., et al. Application of digital image analysis and flow cytometry to enumerate marine viruses stained with SYBR gold. Appl. Environ. Microbiol. 2001, 67. 539-545.

Cheng, S., H. Liu, and B.E. Logan. Increased performance of single-chamber microbial fuel cells using an improved cathode structure. Electrochemistry Communications, 2006. 8(3): p. 489-494.

Chiao, M., et al. Micromachined microbial and photosynthetic fuel cells. J. Micromech. Microeng. 2006, 16, 2547-2553.

Cho, Y. K., et al.Development of a solar-powered microbial fuel cell. J. Appl. Microbiol. 2008, 104, 640-650.

Choi, Y., et al. Optimization of the performance of microbial fuel cells containing alkalophilic *Bacillus* sp. J. Microbiol. Biotechnol. 2001, 11, 863-869.

Chourey, K., et al. Global Molecular and Morphological Effects of 24-Hour Chromium(VI) Exposure on *Shewanella oneidensis* MR-1. Appl. Environ. Microbio., 2006. 72(9): p. 6331-6344.

Clauwaert, P., et al. Biological denitrification in microbial fuel cells. Environmental Science & Technology, 2007. 41(9): p. 3354-3360.

Davis, J.B. and H.F. Yarbrough, Jr. Preliminary Experiments on a Microbial Fuel Cell. Science, 1962. 137(3530): p. 615-616.

de Schamphelaire, L., et al. Microbial fuel cells generating electricity from rhizodeposits of rice plants.

Dollhopf, M.E., et al. Kinetics of Fe(III) and Mn(IV) reduction by the Black Sea strain of *Shewanella putrefaciens* using in situ solid state voltammetric Au/Hg electrodes. Marine Chemistry, 2000. 70(1.

Doane, T.A. et al., "Spectrophotometric determination of nitrate with a single reagent," Analytical Letters 36(12): 2713-2722 (2003).

European, International Search Report and Written Opinion dated Oct. 15, 2009 for PCT/US2009/043848, filed May 13, 2009.

Fenchel, T. Microbial behavior in a heterogeneous world. Science 2002, 296, 1068-1071.

Ferris, M.J. et al., "Denaturing gradient gel electrophoresis profiles of 16S rRNA-defined populations inhabiting a hot spring microbial mat community," Applied Environmental. Microbiology. 62: 340-346 (Feb. 1996).

Goel et al., "Sequential Nitrification and Denitrification in a Divided Cell Attached Growth Bioelectrochemical Reactor," Environmental Engineering Science, vol. 22, pp. 440-449 (Nov. 2005).

Gregory, K.B., D.R. Bond, and D.R. Lovley. Graphite electrodes as electron donors for anaerobic respiration. Environmental Microbiology, 2004. 6(6): p. 596-604.

Ho et al. Integrated In Situ Soil Remediation Technology: The Lasagna Process. Environmental Science and Technology. 29(10):2528-2534.

He, Z. et al., "Electricity generation from artificial wastewater using an upflow microbial fuel cell," Environ. Sci. Technol. 39: 5262-5267 (2005).

He, Z. et al. in "Electricity Production Coupled to Ammonium in a Microbial Fuel Cell," Environ. Sci. Technol. 43: 3391-3397 (2009).

He, Z. et al., "Increased power production from a sediment microbial fuel cell with a rotating cathode," Biosensors and Bioelectronics 22: 3252-3255 (2007).

He, Z., et al. An upflow microbial fuel cell with an interior cathode: Assessment of the internal resistance by impedance Spectroscopy. Environmental Science & Technology, 2006, 40(17): p. 5212-5217.

Hossain, M.A., et al. Finite element modeling of Cr(VI) redution by *Shewanella oneidensis* Mr-1 employing the dual-enzyme kinetic model. Computers and Geosciences, 2005. 31(13): p. 1286-1292.

Hu, Q., et al. Biodiesel from algae: Lessons learned over the past 60 years and future perspectives. J. Phycol. 2006, 42, 12-12.

Inagaki, F., U. Tsunogai, M. Suzuki, A. Kosaka, H. Machiyama, K. Takai, T. Nunoura, K.H. Nealson, and K. Horikoshi. 2004. Characterization of C1-metabolizing prokaryotic communities in methane seep habitats at the Kuroshima Knoll, souther Ryukyu Arc, by analyzing pmoA, mmoX, mxaF, mcrA, and 16S rRNA genes. Appl. Environ. Microbiol. 70: 7445-7455.

Jetten, M. S. et al., "Microbiology and application of the anaerobic ammonium oxidation ('anammox') process," Current Opinion in Biotechnology, 12: 283-288 (2001).

Jukes, T. H., et al. Evolution of protein molecules. In Mammalian protein metabolism; Munro, H. N., Ed.; Academic Press: New York. 1969, pp. 21-132.

Kaku, N., et al. Plant/microbe cooperation for electricity generation in a rice paddy field. Appl. Microbiol. Biotechnol. 2008, 79, 43-49.

Kan, J. J., et al. Temporal variation and detection limit of an estuarine bacterioplankton community analyzed by denaturing gradient gel electrophoresis (DGGE). Aquat. Microb. Ecol. 2006, 42, 7-18.

Khan, S.T.; Horiba, Y,; Takahashi, N.; Hiraishi, A. Activity and community composition of denitrifying bacteria in poly(3-hydroxybutyrate-co-3-hydroxyvalerate)-using solid-phase denitrification process. Microbes Environ. 2007, 22, 20-31.

Khan, S.T. et al., "Members of the family Comamonadaceae as primary poly(3-hydroxybutyrate)-degrading denitrifiers in activated sludge as revealed by a polyphasic approach," Applied Environmental Microbiology, 68: 3206-3214 (Jul. 2002).

Kim, H.J., et al. A mediator-less microbial fuel cell using a metal reducing bacterium, *Schwanella putrefaciense*. Enzyme and Microbial Technology, 2002. 30(2): p. 145-152.

Kim, B.H., et al. Enrichment of microbial community generating electricity using a fuelcell-type electrochemical cell. Applied Microbiology and Biotechnology, 2004. 63(6): p. 672-681.

Kim, J. R. et al., "Analysis of ammonia loss mechanisms in microbial fuel cells treating animal wastewater," Biotechnology and Bioengineering. 99: 1120-1127 (2008).

Kim, J.R., et al. Power generation using different cation, anion, and ultrafiltration membranes in microbial fuel cells. Environmental Science & Technology, 2007. 41(3): p. 1004-1009.

Kindaichi, T.; Ito, T.; Okabe, S. Ecophysiological interactio between nitrifying bacteria and heterotrophic bacteria in autotrophic nitrifying biofilms as determined by microautoradiograhy.

Kornaros, M., C. Zafiri, and G. Lyberatos. Kinetics of denitrification by *Pseudomonas denitrificans* under grown conditions limited by carbon and/or nitrate or nitrite. Water Environment Research, 1996. 68(5): p. 934-945.

Kostka, J.E. and K.H. Nealson. Dissolution and Reduction of Magnetite by Bacteria. Environmental Science & Technology, 1995. 29(10): p. 2535-2540.

Larsen, K. S., et al. Ecosystem respiration depends strongly on photosynthesis in a temperate heath. Biogeochemistry 2007, 85, 201-213.

Liu, C.X., et al. Reduction kinetics of Fe(III), Co(III), U(VI) CR(VI) and Tc(VII) in cultures of dissimilatory metal-reducing bacteria. Biotechnology and Bioengineering, 2002. 80(6): p. 637-349.

Liu, H.; Cheng, S.; Logan, B.E. Power generation in fed-batch microbial fuel cells as a function of ionic strength, temperature, and reactor configuration. Environ. Sci. Technol. 2005, 39, 5488-5493.

Logan,. Extracting hydrogen electricity from renewable resources. *Environmental Science & Technology*, 2004. 38(9): p. 160a-167a.

Logan et al., "Microbial Fuel Cells: Methodology and Technology," *Environmental Science and Technology*. 40(17):5181-5192.

Logan, B.E., et al. Electricity generation from cysteine in a microbial fuel cell. Water Res. 2005, 39, 942-952.

Lloyd, J.R. Microbial reduction of metals and radionuclides. 2003. 27(2-3): p. 411-425.

Lovley, D.R. Bug Juice: harvesting electricity with microorganisms. Nat. Rev. Microbiol. 2006, 4, 497-508.

Lovley, D.R. Dissimilatory Metal Reduction. *Annual Review of Microbiology*, 1993. 47: p. 263-290.

Lovley et al. Microbial reduction of uranium. *Nature*, 1991. 350(6317): p. 413-416.

Lowe et al. "Aerobic and Anerobic Reduction of Cr(VI) by *Shewanella oneidens* Effects of Cationic Metals, Sorbing Agents and Mixed Microbial Cultures," Acta Biotechnology, vol. 23, pp. 161-178 (2003).

Marcus, A.K., C.I. Torees, and B.E. Rittmann. Conduction-based modeling of the biofilm anode of a microbial fuel cell. Biotechnology and Bioengineering, 2007. 98(6): p. 1171-1182.

Menicucci, J., et al. Procedure for determining maximum sustainable power generated by microbial fuel cells. Environmental Science & Technology, 2006. 40(3): p. 1062-1068.

Min, B. et al., "Electricity generation from swine wastewater using microbial fuel cells," Water Research 39: 4961-4968 (2005).

Moon, H., et al. On-line monitoring of low biochemical oxygen demand through continuous operation of a mediator-less microbial fuell cell. *Journal of Microbioloy and Biotechnology*, 2005. 15(1): p. 192-196.

Moon, H.S., J. Komlos, and P.R. Jaffe. Uranium reoxidation in previously bioreduced sediment by dissolved oxygen and nitrate. *Environmental Science & Technology*, 2007. 41(13): p. 4587-4592.

Myers, C.R., et al. Chromium(VI) reductase activity is associated with the cytoplasmic membrane of anaerobically grown *Shewanella putrefaciens* MR-1. Journal of Applied Microbiology, 2000. 88(1): p. 98-106.

Nakajima, H., et al. Overexpression of the Roba Gene Increases Organic-Solvent Tolerance and Multiple Antibiotic and Heavy-Metal Ion Resitance in *Escherichia-coli*. Applied and Environmental Microbiology, 1995. 61(6): p. 2302-2307.

Nealson et al., *Ecophysiology of the Genus Shewanella*, in *The Prokaryotes*. 2006, Springer New York. p. 1133-1151.

Nealson, K.H. and W. Berelson. 2003. Layered microbial communities and the search for life in the universe. Geomicrobiol. J. 20: 451-462.

Nealson et al. Ecophysiology of the Genus *Shewanella*. In: Dworkin et al. Eds. The Prokaryotes: An evolving electronic resource for the microbiological community. 3rd Ed. Release 3.7., Nov. 2003. Springer-Verlag, N.Y. http://link.springer-ny.com/link/service/books/10125/.

Neef, A. et al., "Monitoring a widespread bacterial group: in situ detection of planctomycetes with 16S rRNA-targeted probes," Microbiology (Reading, U.K.), 144: 3257-3266 (1998).

Ochiai, H., et al. "Living electrode" as a long-lived photoconverter for biophotolysis of water. Proc. Natl. Acad. Sci. USA 1980, 77, 2442-2444.

Oremland, R. S., et al. Anaerobic oxidation of arsenite in Mono Lake water and by facultative, arsenite-oxidizing chemoautotroph, strain MLHE-1. Appl. Environ. Microbiol. 2002, 68, 4795-4802.

Park, D.H. And J.G. Zeikus. Improved fuel cell and electrode designs for producing electricity from microbial degradation. *Biotechnology and Bioengineering*, 2003. 81(3): p. 348-355.

Park, H. I., et al. Bacterial communities on electron-beam Pt-deposited electrodes in a mediator-less microbial fuel cell. Environ. Sci. Technol. 2008, 42, 6243-6249.

PCT, International Search Report and Written Opinion for Application No. PCT/US2008/062391, dated Apr. 30, 2009, 12 pages.

Rabaey et al., Microbial fuel cells: novel biotechnology for energy generation. *TRENDS in Biotechnology*, 2005, 23(6):291-298.

Rabaey, K., et al. Microbial phenazine production enhances electron transfer in biofuel cells. *Environmental Science & Technology*, 2005. 39(9): p. 3401-3408.

Reimers, C.E., et al. Harvesting energy from the marine sediment-water interface. *Environmental Science & Technology*, 2001. 35(1): p. 192-195.

Rosenbaum, M., et al. In situ electrooxidation of photobiological hydrogen in a photoioelectrochemical fuel cell based on *Rhodobacter sphaeroides*. Environ. Sci. Technol. 2005, 39, 6328-6333.

Rosson, R.A. and K.H. Nealson. Manganese Binding and Oxidation by Spores of a Marine *Bacillus*. Journal of Bacteriology, 1982. 151(2): p. 1027.

Rozendal, R.A., H.V.M. Hamelers, and C.J.N. Buisman. Effects of membrane cation transport on pH and microbial fuel cell performance. *Environmental Science & Technology*, 2006. 40(17): p. 5206-5211.

Saitou, N., et al. The Neighbor-Joining Method—A New Method for Reconstructing Phylogenetic Trees. Mol. Biol. Evol. 1987, 4, 406-425.

Schäfer, H. and G. Muyzer, "Denaturing gradient gel electrophoresis in marine microbial ecology," Chapter 22 in Methods in Microbiology, J.H. Paul, Ed.; Academic Press: London, vol. 3, Marine Microbiology, pp. 425-468 (2001).

Schmidt, I.; Bock, E. Anaerobic ammonia oxidation by cell-free extracts of *Nitrosomonas eutropha*. Antonie van Leeuwenhoek 1998, 73, 271-278.

Schmidt, I. et al., "New concepts of microbial treatment processes for the nitrogen removal in wastewater," FEMS Microbiology Reviews 27: 481-492 (2003).

Schmieman et al., Comparative kinetics of bacterial reduction of chromium. *Journal of Environmental Engineering-Asce*, 1998. 124(5): p. 449-455.

Schröder, U., "Anodic electron transfer mechanisms in microbial fuel cells and their energy efficiency," Phys. Chem. Chem. Phys. 9: 2619-2629 (2007).

Senko, J.M., et al. The effect of U(VI) bioreduction kinetics on subsequent reoxidation of biogenic U(IV). Geochimica Et Cosmochimica Acta, 2007. 71(19): p. 4644-4654.

Shantaram, A., et al. Wireless sensors powered by microbial fuel cells. *Environmental Science & Technology*, 2005. 39(13): p. 5037-5042.

Sliekers, A. O. et al., "Completely autotrophic nitrogen removal over nitrite in one single reactor," Water Research 36: 2475-2482 (2002).

Stal, L. J., et al. Structure and Development of a Benthic Marine Microbial Mat. FEMS Microbiol. Ecol. 1985, 31, 111-125.

Strik, D. P. B. T. B., et al. Green electricity production with living plants and bacteria in a fuel cell. Int. J. Energy Res. 2008, 32, 870-876.

Strik, D. P. B. T. B., et al. Renewable sustainable biocatalyzed electricity production in a photosynthetic algal microbial fuel cell (PAMFC). Appl. Microbiol. Biotechnol. 2008, DOI 10.1007/s00253-008-1679-8.

Strous, M. et al., "The sequencing batch reactor as a powerful tool for the study of slowly growing anaerobic ammonium-oxidizing microorganisms," Appl. Microbiol. Biotechnol. 50: 589-596 (1998).

Takai, K., K.H. Nealson, and K. Horikoshi. 2004. *Hydrogenomonas thermophila* gen. nov., sp. Nov., a novel thermophilic, hydrogen-oxidizing chemolithoautotroph within the $\Sigma$-Proteobacteria, isolated from a black smoker in a Central Indian Ridge hydrothermal field. Int. J. Syst. Evol. Microbio. 54: 25-32.

Tanaka, K., et al. Bioelectrochemical fuel-cells operated by the cyanobacterium, *Anabaena variabilis*. J. Chem. Tech. Biotechnol. 1985, 35B, 191-197.

Tanaka, K., et al. Effects of light on the electrical output of bioelectrochemical fuel-cells containing *Anabaena variabilis* M-2: mechanism of the post-illumination burst. J. Chem. Tech. Biotechnol. 1988, 42, 235-240.

Tebo et al., Sulfate-reducing bacterium grows with Cr(VI), U(VI), Mn(IV), and Fe(III) as electron acceptors. *Fems Microbiology Letters*, 1998. 162(1): p. 193-198.

Tempest, D.W. and J.T.M. Wouters. Properties and Performance of Microorganisms in Chemostat Culture. Enzyme and Microbial Technology, 1981. 3(4): p. 283-290.

Thamdrup et al., "Production of $N_2$ through anaerobic ammonium oxidation coupled to nitrate reduction in marine sediments," Appl. Environ. Microbiol. 68(3): 1312-1318 (2002).

Torres, C.I., A.K. Marcus, and B.E. Rittman. Kinetics of consumption of fermentation products by anode-respiring bacteria. Applied Microbiology and Biotechnology, 2007. 77(3): 689-697.

Turick, C.E., C.E. Camp, and W.A. Apel. Reduction of Cr(6(+)) to Cr(3(+)) in a packed-bed bioreactor. *Applied Biochemistry and Biotechnology*, 1997. 63-5: p. 871-877.

Vainshtein et al. Model experiments on the microbial removal of chromium from contaminated groundwater. *Water Research*, 2003. 37(6): p. 1401-1405.

van Dongen, U., Jetten, M.S.M.; van Loosdrecht, M.C.M. The SHARON((R)-Anammox((R)) process for treatment of ammonium rich wastewater. Water Sci. Technol. 2001, 44, 153-160.

Videla, H.A. and A.J. Arvia. Response of a Bioelectrochemical Cell with *Saccharomyces-cervisiae* Metabolizing Glucose under Various Fermentation Conditions. *Biotechnology and Bioengineering*, 1975. 17(10): p. 1529-1543.

Virdis, B.; Rabaey, K.; Yuan, Z.; Keller, J. Microbial fuel cells for simultaneous carbon and nitrogen removal. Water Res. 2008, 42, 3013-3024.

Wang, Y.T., M.T. Suidan, and B.E. Rittmann. Modeling Biofilm Kinetics for a Low-Loaded Expanded-Bed Anaerobic Reactor. Biotechnology and Bioenginerring, 1987. 30(1): p. 15-21.

Verhagen, F. J. M. and H.J. Laanbroek, "Competition for Ammonium between Nitrifying and Heterotrophic Bacteria in Dual Energy-Limited Chemostats," Appl. Environ. Microbiol. 57: 3255-3263 (Nov. 1991).

Webster, I.A. The Continuously Fed Batch Reactor for Measuring Microbial-Growth Rates. Biotechnology and Bioengineering, 1983. 25(12): p. 2981-2990.

Wiesmann, U., "Biological nitrogen removal from wastewater," Advances in Biochemical Engineering Biotechnology; A. Fiechter, Ed.; Springer-Verlag: Berlin, 51:113-153 (1994).

Wrighton, K. C., et al. A novel ecological role of the Firmicutes identified in a thermophilic microbial fuel cell. ISME J. 2008, doi: 10.1038/ismej.2008.48.

Xing, D. F., et al. Electricity generation by *Rhodopseudomonas palustris* DX-1. Environ. Sci. Technol. 2008, 42, 4146-4151.

You, S.-J., "Identification of denitrifying bacteria diversity in an activated sludge system by using nitrite reductase genes," Biotechnology Letters 27: 1477-1482 (2005).

Zhang, T., et al. Improved performances of *E. coli*-catalyzed microbial fuel cells with composite graphinte/PTFE anodes. *Electrochemistry Communications*, 2007. 9(3): p. 349-353.

Zhang, X.C. and A. Halme. Modeling of a Microbial Fuel-Cell Process. Biotechnology Letters, 1995. 17(8): p. 809-814.

KIPO Commisioner, PCT Search Report and Written Opinion for Application No. PCT/US2010/022773, dated Aug. 19, 2010, 10 pages.

PCT Search Report and Written Opinion for Application No. PCT/US2009/043848, dated Oct. 15, 2009, 12 pages.

PCT Search Report and Written Opinion for Application No. PCT/US2008/062391, dated Apr. 30, 2009, 8 pages.

\* cited by examiner

MICROBIAL FUEL CELLS

CROSS-REFERENCE TO RELATED APPLICATIONS

This application claims the benefit under 35 U.S.G. §119(e)(1) of U.S. provisional application 60/915,650, filed May 2, 2007, which is incorporated by reference herein in its entirety.

STATEMENT OF GOVERNMENT INTEREST

This work was supported by the United States Department of Energy *Shewanella* Federation program (Award No. 58486720) and the United States Department of Defense (Air Force) AFOSR MURI program (Award No. FA9550-06-1-0292), thus the U.S. government may have certain rights in the invention.

BACKGROUND

This application relates to microbial fuel cells, and more particularly to microbial fuel cells with biocatalysts on both the anode and the cathode of the fuel cell.

Various microbial fuel cell (MFC) designs focus primarily on power generation utilizing oxygenic reduction. In these designs, the anode compartment is operated anaerobically while the cathode compartment is operated aerobically. MFCs rely on bacteria to catalyze oxidation reactions in the anodic chamber of the MFC system. In this manner, electrons can be passed from this oxidation reaction to the cathode electrode where an appropriate acceptor can be reduced. Reported electron donors include substances such as lactate, glucose, and organic substances found in wastewater. An inorganic catalyst such as platinum is used to drive the reduction of oxygen at the cathode. The use of such catalysts can be costly and limits the variety of electron acceptors that can be reduced in the fuel cell.

SUMMARY

In one aspect, a microbial fuel cell includes an anode compartment with an anode and an anode biocatalyst, a cathode compartment with a cathode and a cathode biocatalyst, a membrane positioned between the anode compartment and the cathode compartment, and an electrical pathway between the anode and the cathode. The anode biocatalyst is capable of catalyzing oxidation of an organic substance, and the cathode biocatalyst is capable of catalyzing reduction of an inorganic substance.

In some implementations, the anode, compartment is substantially impermeable to the anode biocatalyst and the cathode compartment is substantially impermeable to the cathode biocatalyst. The cathode compartment can be maintained under substantially anaerobic conditions.

In some cases, the anode biocatalyst and the cathode biocatalyst are substantially the same. The cathode biocatalyst can include metal-reducing bacteria or metal-oxidizing bacteria. The cathode biocatalyst can be oxygen-tolerant. In some embodiments, the cathode biocatalyst is a species of *Shewanella*. The inorganic substance can be a radionuclide or a metal, including a semi-conductor. In some eases, the inorganic substance is chromium(VI), and the cathode biocatalyst is capable of reducing chromium(VI) to chromium(III). In certain embodiments, the cathode biocatalyst is capable of reducing a concentration of chromium(VI) in the cathode compartment to less than about 1 ppb.

In some implementations, the fuel cell is self-contained and/or self-powered. The fuel cell is operable to generate electricity. The fuel cell is operable for in situ soil or water remediation in marine or freshwater environments.

In another aspect, a microbial fuel cell includes an anode compartment with an anode and an anode biocatalyst, a cathode compartment with a cathode and a cathode biocatalyst, a membrane positioned between the anode compartment and the cathode compartment, and an electrical pathway between the anode and the cathode. The anode biocatalyst is capable of catalyzing oxidation of an inorganic substance, and the cathode biocatalyst is capable of catalyzing reduction of an organic substance.

In another aspect, a method of generating electricity includes positioning a microbial fuel cell in a Ideation proximate a medium with an inorganic contaminant and providing the contaminated medium to the fuel cell. The method, further includes catalyzing oxidation of an organic substance with bacteria in the fuel cell, catalyzing reduction of the contaminant with bacteria in the fuel cell to form a reduced contaminant, forming a precipitate comprising the reduced contaminant, and substantially containing the precipitate in the fuel cell.

In some implementations, positioning the fuel cell in a location proximate the medium includes placing the fuel cell in the medium. In other implementations, positioning the fuel cell in a location proximate the medium includes placing the fuel cell outside of the medium. The medium can include soil or water. Providing the contaminant to the fuel cell can include allowing the medium to diffuse toward the fuel cell, transporting the medium toward the fuel cell, and/or electrokinetically assisting the contaminants toward the fuel cell.

In some embodiments, the method further includes reducing a concentration of the contaminant in the fuel cell or in the medium to less than about 1 ppb. In certain cases, substantially containing the precipitate in the fuel cell includes inhibiting oxidation of the reduced contaminant. The bacteria can be substantially contained in the fuel cell. The fuel cell, including the precipitate and/or the bacteria can be removed from the medium. In some embodiments, oxidation of the reduced contaminant is inhibited.

In another aspect, a method of generating electricity includes positioning, a microbial fuel cell in a location proximate a medium with an inorganic contaminant and providing the contaminated medium to the fuel cell. The method further includes catalyzing reduction of an organic or inorganic substance with bacteria in the fuel cell, catalyzing oxidation of the contaminant with bacteria in the fuel cell to form an oxidized contaminant, forming a precipitate including the oxidized contaminant at the anode, and substantially containing the precipitate in the fuel cell.

Using bacteria as biocatalysts on both the anode and cathode of the microbial fuel cell eliminates the need for expensive inorganic catalysts, such as platinum. Pure culture biocatalysis of both anode and cathode reactions in an MFC, as seen in this example, have the advantage that self-sustenance and repair can prevent poisoning/fouling seen in inorganic catalysts. Using bacteria as biocatalysts on both the anode and cathode of the microbial fuel cell increases, the activity level of reducing microorganisms exposed, but not released, to local environments. This high level of activity will generate faster kinetics and ultimately shorten treatment times for in situ operation, while reducing biomass in both compartments of the fuel cell. Containment of precipitated substances allows substantially complete removal of the contaminants, essentially eliminating subsequent re-oxidation and/or mobilization of the contaminants. By confining the biological reactions to compartments within the fuel cell, no non-indigenous microorganisms will be introduced into environmental systems. Solid precipitates formed from reduced contaminants can be trapped in the fuel cell for recovery and disposal/reuse when the fuel cell operations have been completed. Additionally, the microbial fuel cells described herein can produce electrical energy for process energy demands or other uses.

The details of one or more embodiments of the invention are set forth in the accompanying drawings and the description below. Other features, objects, and advantages of the invention will be apparent from the description and drawings, and from the Claims.

DESCRIPTION OF DRAWINGS

Like reference symbols in the various drawings indicate like elements.

DETAILED DESCRIPTION

Microbial fuel cells (MFCs) described herein can be used for remediation of soil or water contaminated with pollutants that form precipitates with the completion of a reduction or oxidation reaction. Such MFCs can allow soluble substances to be reduced on the cathode or oxidized on the anode in an anerobic redox reaction to form insoluble substances with different valence states. For example, soluble hexavalent chromium, Cr(VI), can be reduced at the Cathode to form trivalent chromium, Cr(III). The trivalent form of chromium is known to readily form insoluble precipitates with commonly found environmental anions (OH$^-$, PO$_4^{2-}$, etc.). After treatment, the MFC containing the insoluble species can be removed from the treatment site for disposal or reuse.

Figure 1:
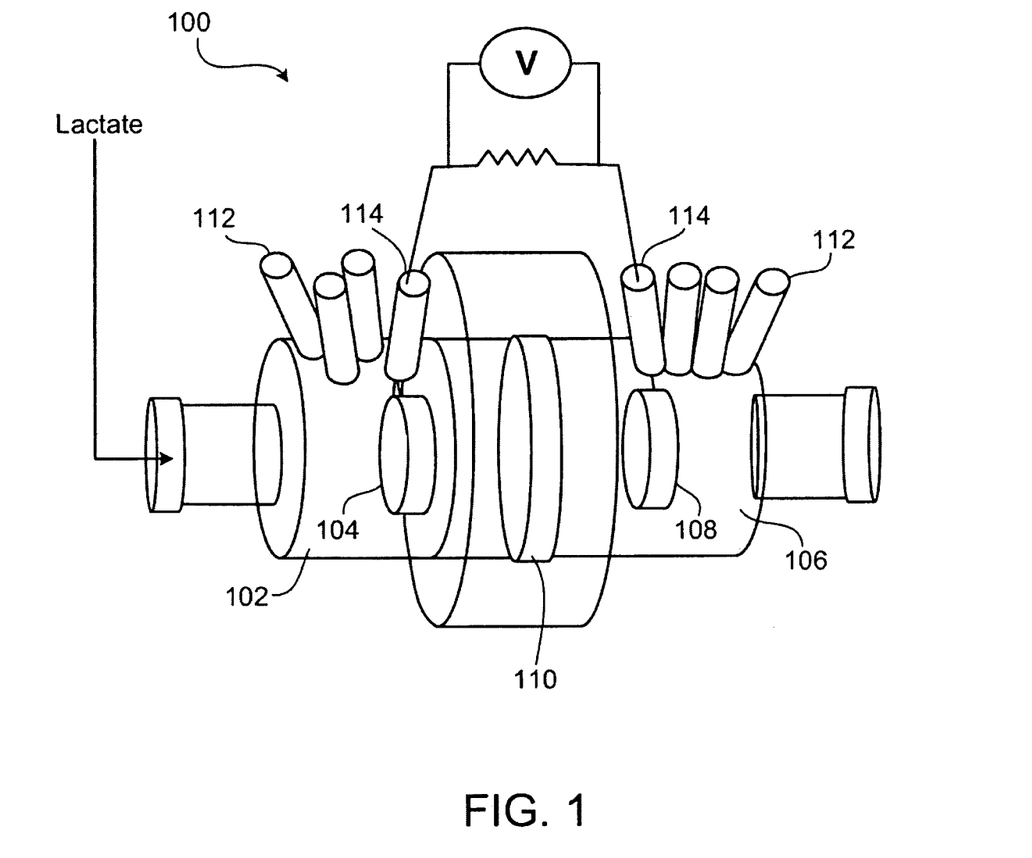
FIG. 1 is a schematic diagram of an exemplary microbial fuel cell.

MFCs described herein can be used in batch or continuous flow operation. FIG. 1 depicts a schematic diagram of an exemplary MFC 100 designed for batch operation. MFC 100 includes anode compartment 102 with anode 104 and cathode compartment 106 with cathode 108. Anode 104 and cathode 108 can be, for example, graphite felt electrodes. Membrane 110 is positioned between anode compartment 102 and cathode compartment 106. Membrane 110 can be any membrane that is substantially impermeable to the substance targeted for removal from the medium undergoing treatment. In some cases, membrane 110 is an ion exchange membrane or a nanoporous filter or membrane including nylon, cellulose, or polycarbonate. Anode compartment 102 and cathode compartment 108 include gas ports 112 and conductive leads 114. In some embodiments, one or more leads 114 include platinum. MFC 100 can be operated with the addition of feed and effluent lines to form a continuous flow MFC system.

Figure 2:
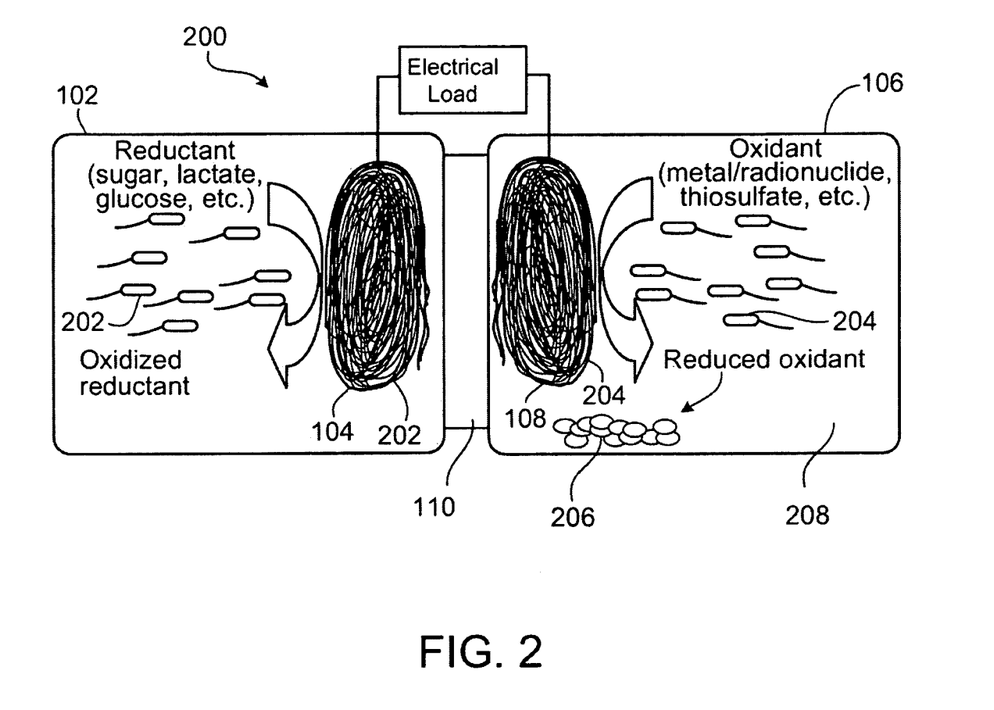
FIG. 2 is a schematic diagram showing reaction processes in a microbial fuel cell.

FIG. 2 depicts a schematic diagram of oxidation and reduction processes in MFC 200. Biocatalysts 202 and 204, shown on anode 104 and cathode 108, respectively, are used as the catalytic agents for anodic and cathodic electron transfer. The catalytic agents can be pure culture biofilms or enriched microbial cultures or consortia, Biocatalysts 202 and 204 may be the same or different.

Metal reducing bacteria capable of attaching and forming a bio film at the anode and/or cathode can be used in MFCs to catalyze oxidation and/or reduction reactions. The metal-reducing bacteria are able to chemically reduce, and render insoluble, a variety of inorganic substances, including ions of metals, semiconductors, etc. Some metal-reducing bacteria that can be used without mediators in fuel cells include *Geobacter metallireducens, Geobacter sulfurreducens, Rhodoferax ferrireducens, Pseudomonas aeruginosa*, and members of the genus *Shewanella*. Of these, only *Shewanella* and *P. aeruginosa* are facultative anaerobes; the rest are obligate anaerobes.

*Shewanella* species are soil- and sediment-dwelling bacteria common in both fresh and marine water environments. These facultative anaerobic bacteria respire a wide variety of inorganic and organic electron acceptors including soluble toxic metals or ions thereof, such as uranium and chromium, under anaerobic conditions. Suitable *Shewanella* species include, but are not limited to, *S. putrefaciens* SP200, *S. oneidensis* MR-1, S. species PV4, and *S amazonensis* SB2B.

In one embodiment, both the anodic and the cathodic reactions of an MFC are driven with *S. oneidensis* MR-1. MR-1 is able to efficiently pass electrons to the anode electrode without the introduction of an external electron shuttle/mediator such as anthraquinone disulfuonate or neutral red. MR-1: has versatile metabolism at both the anode and cathode. As a biocatalyst on the cathode, MR-1 is able to utilize most substances reduced in anaerobic batch mode, such as NO$_3^+$, SO$_4^{2-}$, and Fe$^{3+}$.

Increased efficiency of MFCs can be achieved, through optimization of gene expression in *Shewanella* or other metal-reducing bacteria. Over-expression of certain genes may lead to increased electron transfer from the electrode to the metal, resulting in improved kinetics and reductive capabilities.

Referring to FIG. 2, biocatalyst 202 catalyzes oxidation reactions in anode compartment 102. Resulting electrons are passed from the oxidation reactions at the anode 104 to the cathode 108, where reduction of an electron acceptor is catalyzed by biocatalyst 204. Electron donors in the anode compartment 102 can include any respirable organic substances found in the medium undergoing treatment such as, for example, lactate, glucose, and other organics found in wastewater. Reducible substances in the cathode compartment 106 include, for example, oxygen, organic substances (e.g., fumarate), and inorganic substances including radionuclides (e.g., uranium and technetium) and other metals (e.g., hexavalent chromium, arsenic, iron, manganese, selenium, etc.). Other inorganic substances that can be reduced include, for example, thiosulfate and other sulfur-containing substances, such as polysulfide and elemental sulfur.

For reduction of electron acceptors other than oxygen, the cathode compartment is kept substantially anaerobic to essentially eliminate the competing oxygen reduction reaction. This can be accomplished, for example, by continuous sparging of nitrogen into the cathode compartment. A high cell concentration of a facultative anaerobe (such as *Shewanella*) will also scavenge oxygen in the compartment. A non-oxygen electron acceptor (e.g., an oxidized metal substance) present at the cathode can act as the oxidizing agent. Substances that react at the cathode to form insoluble substances are contained in the cathode compartment of the fuel cell as a solid precipitate 206, and are unable to re-enter the medium undergoing treatment. Following treatment, the fuel cell 200, and thus the precipitated form of the contaminant 206 can be removed from the medium 208.

When the contaminant is chromium, for example, Cr(VI) is reduced in the cathode compartment of an MFC to Cr(III), which can react in water to form insoluble substances such as $Cr(OH)^{2+}$, $Cr(OH)_3$, and $Cr(OH)_4^-$. Depending on the chemical composition of the contaminated medium, Cr(III) may also form complexes with sulfate, ammonium, cyanide, fluoride, chloride, and natural organic matter. Thus, the amount of solid precipitation will depend on characteristics of the contaminated medium. With MFCs described herein, precipitation of trivalent chromium substances can remove hexavalent chromium from solution, resulting in a concentration of hexavalent chromium in the cathode compartment of a microbial fuel cell, or in the contaminated medium, of less than about 2 ppb, less than about 1 ppb, less than about 0.5 ppb, or less than about 0.2 ppb.

In some embodiments, oxidation of an inorganic substance occurs at the anode with metal-oxidizing bacteria, and reduction of an organic substance occurs at the cathode with the same or different bacteria. The oxidized organic substance forms a precipitate in the anode compartment. The precipitate is contained in the anode compartment, allowing the precipitated form of the contaminant to be contained in the MFC. After treatment, the MFC containing the precipitated form of the contaminant can be removed from the medium.

The fuel cell depicted in FIG. 2 can be modified to increase power output, provide renewable power generation, and oxidize or reduce selected substances with desired efficiency. Modifications include, for example, choosing appropriate bacteria for the anode and cathode, reducing internal resistance by altering electrode structure, enhancing diffusion or transport, and selecting membranes suitable for particular applications.

Concentrated microbial cultures in self-contained MFC systems provide high reductive rates. At high rates of reduction, a steep concentration gradient can develop proximate the fuel cell. Contaminant transport from surrounding areas by diffusion or advection is enhanced in some cases by electrokinetic assistance, in which an electric field is applied to selectively direct the migration of contaminants toward the MFC, thereby increasing contaminant concentration and remediation rates within the fuel cell. Electrical energy generated by operation of the fuel cell can be used to support electrical demand as needed, e.g., for either the electrokinetic electrodes used in the electrokinetic process or other electrical needs of the operation.

Figure 3:
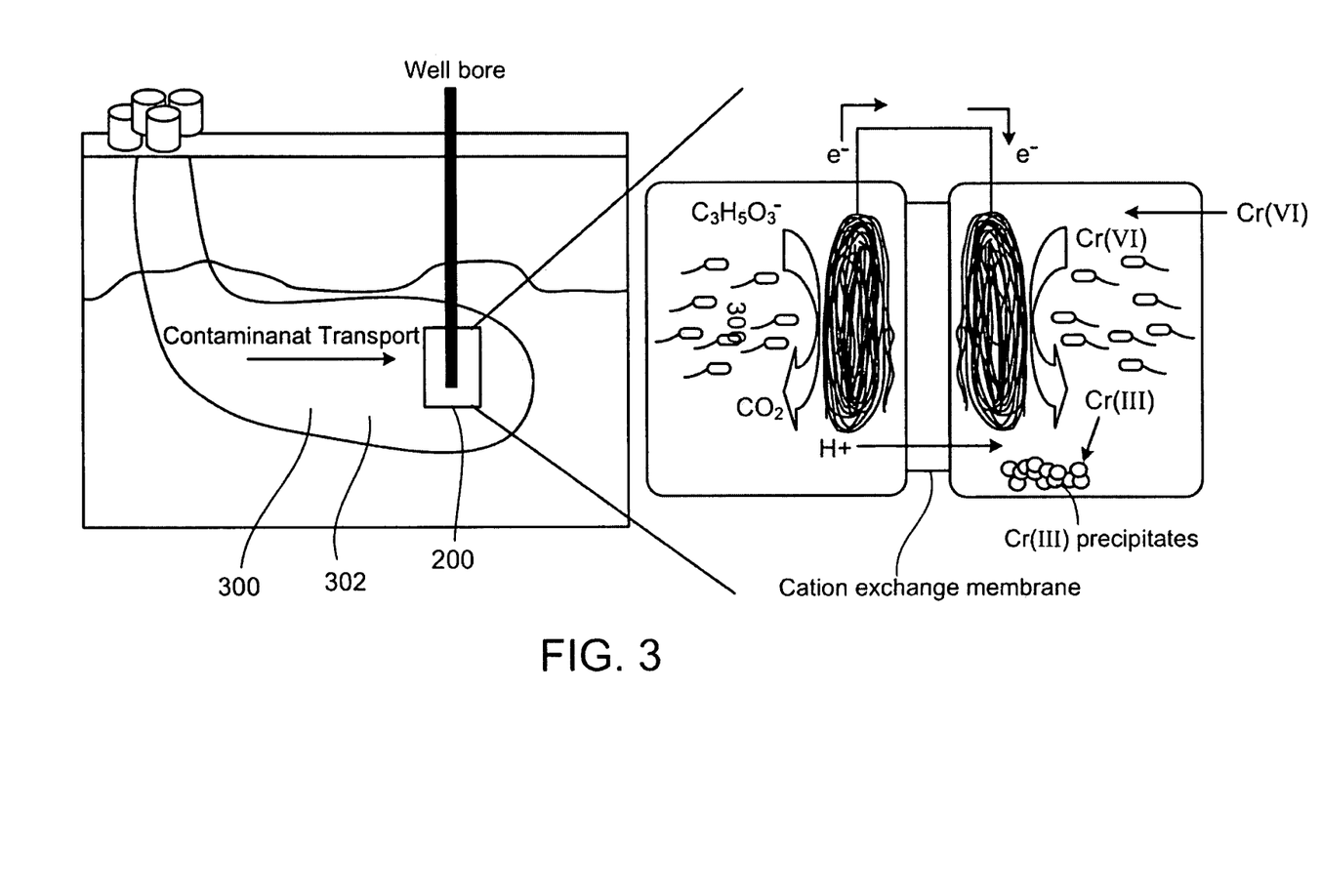
FIG. 3 depicts a microbial fuel cell in a wellbore.

The MFCs described herein can be used for in situ as well as ex situ operation. In situ treatment of contaminated media, such as groundwater, can be accomplished by operation within a wellbore or barrier system. FIG. 3 depicts MFC 200 in wellbore 300 with medium 302. In situ treatment can be enhanced with electrokinetic assistance, as described above. Ex situ treatment systems can be incorporated as a flow-through unit into active waste processing or effluent discharge streams, including industrial or metal-working waste streams, or waste streams in sewage treatment or food processing plants.

Sequestration of foreign biomass and reduced substances can be accomplished with appropriate design of a fuel cell apparatus. Large, localized, densities of specific bacteria can be utilized followed by removal of the bacteria (e.g., when treatment or decontamination is complete), for example, to minimize disturbance of local subsurface ecosystems. By confining the biological reactions to compartments within the MFC, introduction of non-indigenous microorganisms into environmental systems is avoided. Solid precipitates formed from reduced contaminants can be trapped in the MFC (e.g., in the cathode compartment for the case of Cr(VI)) for recovery and disposal/reuse when the fuel cell operations have been completed and the fuel cell is removed from the contaminated medium or treatment site. The potential danger of reoxidation and mobilization of contaminants associated with current in situ technologies is avoided with recovery of contaminants from affected sites.

The following examples are provided to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

EXAMPLE 1

Dual compartment MFCs were used to observe the differences in current generation when using a microbial catalyst at the anode and cathode under different catholyte conditions. All MFCs were assembled using pretreated NAFION® 117 (E. I. du Pont de. Nemours and Company, USA) ion exchange membranes and electrodes constructed from graphite felt bonded to platinum wire with a graphite conductive adhesive.

Pure culture biomass was utilized as the anode and cathode catalyst on the fuel cell depicted in FIG. 1. *S. oneidensis* MR-1 cultures were obtained from stable chemostat operation started from frozen stocks stored at −80° C. MFCs were sterilized by autoclave followed by addition of sterile PIPES buffer and MR-1 from stable chemostats. The planktonic MR-1 strain was cultivated aerobically in *Shewanella* Federation Minimal Media using lactate as the electron donor. The harvested MR-1 was injected into both MFC compartments, to achieve an optical density of 0.20 (at 600 nm).

Resistance across the MFC electrodes was set to 10Ω and voltage monitored throughout the experiment. Addition of lactate to the anode compartment and appropriate electron acceptor (either oxygen or fumarate) to the cathode compartment marked the zero time point. Sampling was performed at regular intervals to monitor suspended cell concentration and organic acid concentrations.

Oxygen was provided to the cathode of the first MFC by continuously flowing air through the cathode compartment at a rate of 20 mL/min. Sodium fumarate was injected into the cathode compartment of the second MFC to achieve 20 mM starting concentrations. All MFC experiments began with lactate (20 mM) as the fuel at the anode. The anolyte and catholyte solutions were sampled periodically and analyzed using high-pressure liquid chromatography to monitor the metabolic products present in the anode and cathode compartments.

Figure 4A:
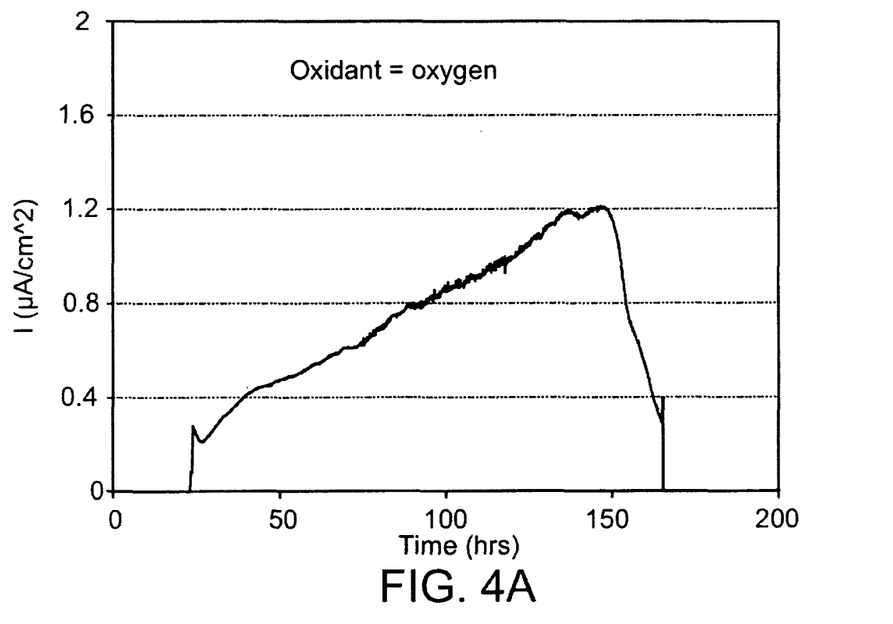
FIG. 4A shows MRC current density for a lactate/oxygen system.
Figure 4B:
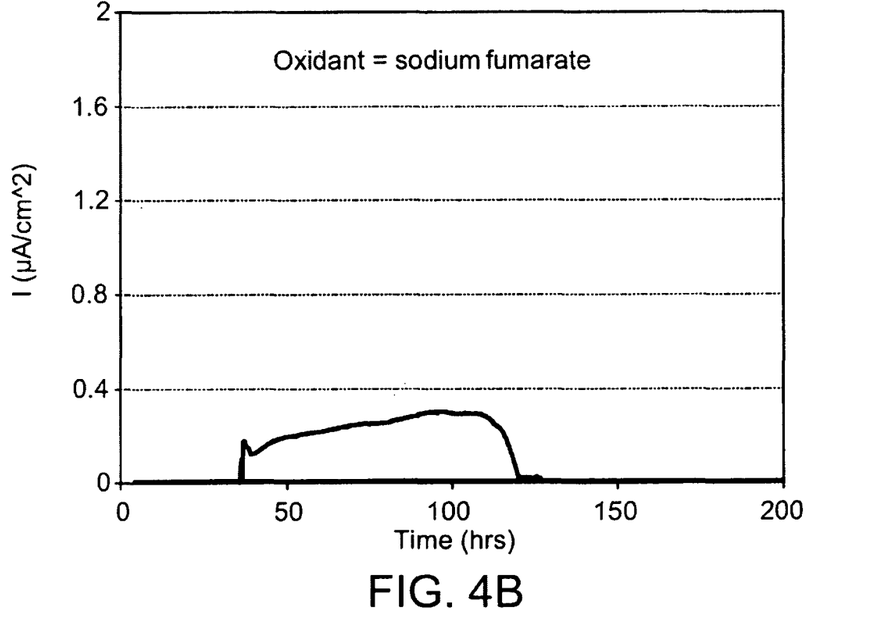
FIG. 4B shows MRC current density for a lactate/fumarate system.
Figure 5A:
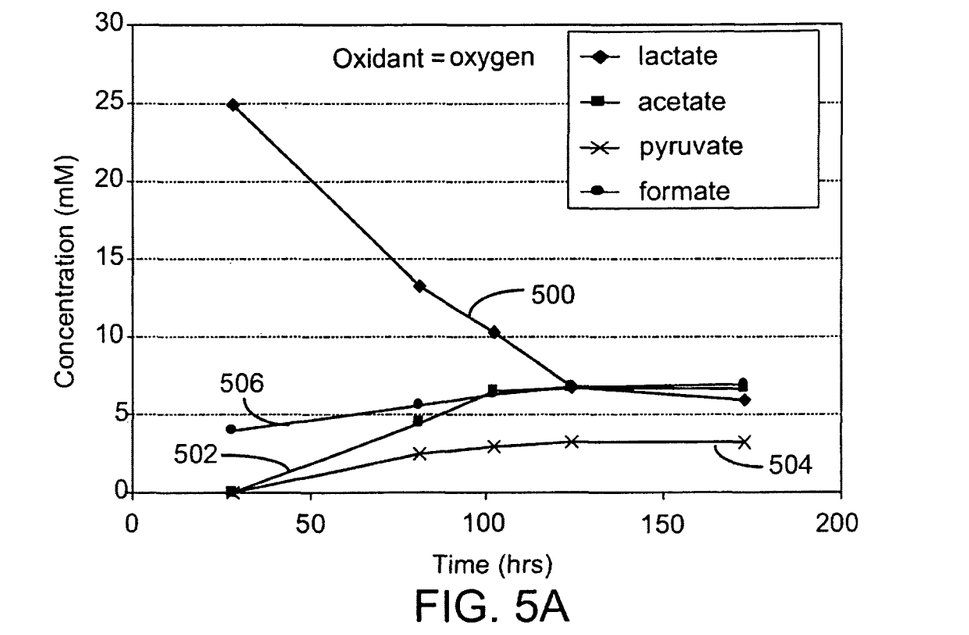
FIG. 5A shows anode organic acid concentration for a lactate/oxygen system.
Figure 5B:
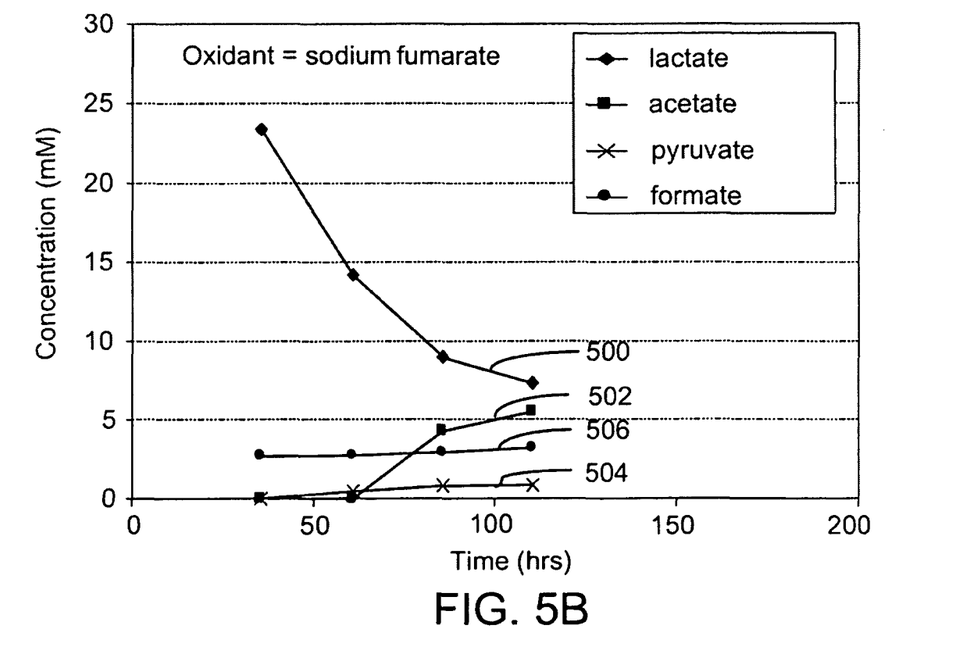
FIG. 5B shows anode organic acid concentration for a lactate/fumarate system.

Current density vs. time data were calculated using the measured cell potential across a 10Ω resistor. FIGS. 4A and 4B depict current densities as a function of time for the lactate/oxygen system and the lactate/fumarate system, respectively. As seen in FIGS. 4A and 4B, the maximum current densities for the lactate/oxygen MFC were approximately four times higher than the lactate/fumarate system. Additionally, as seen in FIGS. 5A and 5B, for the lactate/oxygen system and the lactate/fumarate system, respectively, each MFC system showed unique lactate 500, acetate 502, pyruvate 504, and formate 506 oxidation rates, indicating that the cathodic reduction was the rate limiting reaction when MR-1 are utilized at the anode and cathode with both oxidants.

Anode, cathode, and membrane samples were taken from fuel cells operating at peak current production and at current cessation. Samples were fixed in 2.5% glutaraldehyde, and dehydrated using an increasing series of ethanol concentrations. Critical point drying was performed as the final step (Tousimis AUTOSAMDRI® 815 Series A, Tousimis; Rockville, Md.) before scanning electron micrographs were generated utilizing a Cambridge 360 scanning electron microscope operating at 15 kV.

Minimum biofilm development at the anode was observed in both the lactate/oxygen and the lactate/fumarate MFCs based on SEM micrographs. However, cathode images showed a well-developed biofilm (up to 6 μm thick) at the electrode surface of the lactate/oxygen system and very little development on the cathodes form the lactate/fumarate systems. These results indicated that the cathode: oxidant had a strong impact on the metabolic activity and growth of the MR-1 at the anode and cathode electrodes.

EXAMPLE 2

Figure 6:
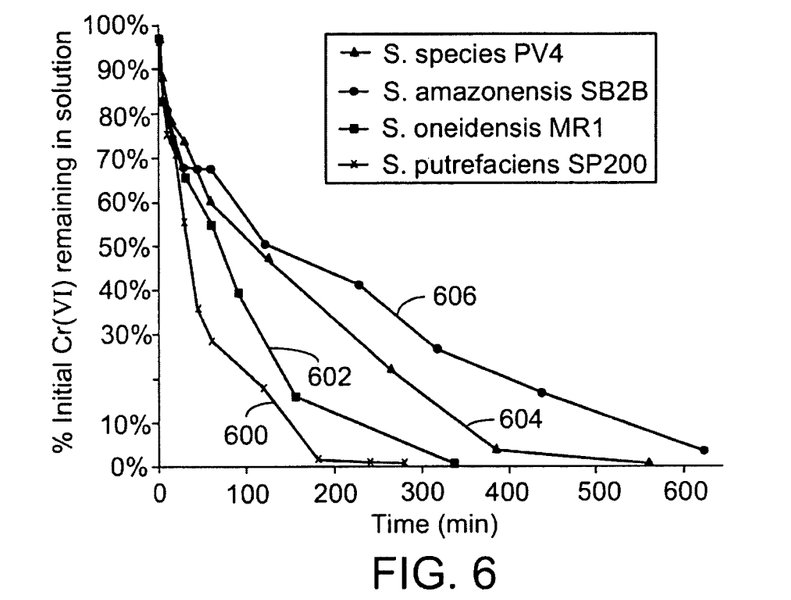
FIG. 6 shows % of initial Cr(VI) remaining in solution during a remediation process in microbialfuel cells with Shewanella species as biocatalysts on both the anode and cathode.

Microbial chromium reduction was performed with four Shewanella ssp.: S oneidensis MR-1, S. amazonensis SB2B, S. putrefaciens SP200, and S. species PV4. Cell cultures were grown from frozen stock in defined minimal media under aerobic conditions for 24-48 hours. Cultures were then diluted with minimal media to achieve a biomass concentration of about 35 mg volatile suspended solids (VSS) per liter. These cells were then transferred to an anaerobic glove box for 1-2 hours. Cultures were then spiked with stock Cr(VI) solution to achieve a final concentration of 5 ppm Cr(VI) for each culture. As shown in FIG. 6, the Cr(VI) concentration was reduced to less than 40 ppb in less than 5 hours for S. putrefaciens SP200 600, S oneidensis MR-1 602, S. species PV4 604, and S. amazonensis SB2B 606. Within 48 hours, Cr(VI) concentrations were significantly below 2 ppb for S. species PV4 604 and S. amazonensis SB2B 606. Fitting the data to a first order rate dependence on chromium concentration show rate of removal for S putrefaciens SP200 to be greater than that of other strains tested (TABLE I).

TABLE I

First order decay constants for Cr(VI) reduction

| Species | First order decay constant (min$^{-1}$) × 10$^2$ |
| --- | --- |
| S. putrefaciens SP200 | 1.94 |
| S oneidensis MR-1 | 1.45 |
| S. species PV4 | 0.86 |
| S. amazonensis SB2B | 0.45 |

Similar batch culture experiments were performed to examine the effects of different carbon sources on Cr(VI) removal rates. The results indicated that reduction favored the utilization of substances, such as lactate or molasses, an inexpensive agricultural waste, as electron donors.

EXAMPLE 3

Figure 7:
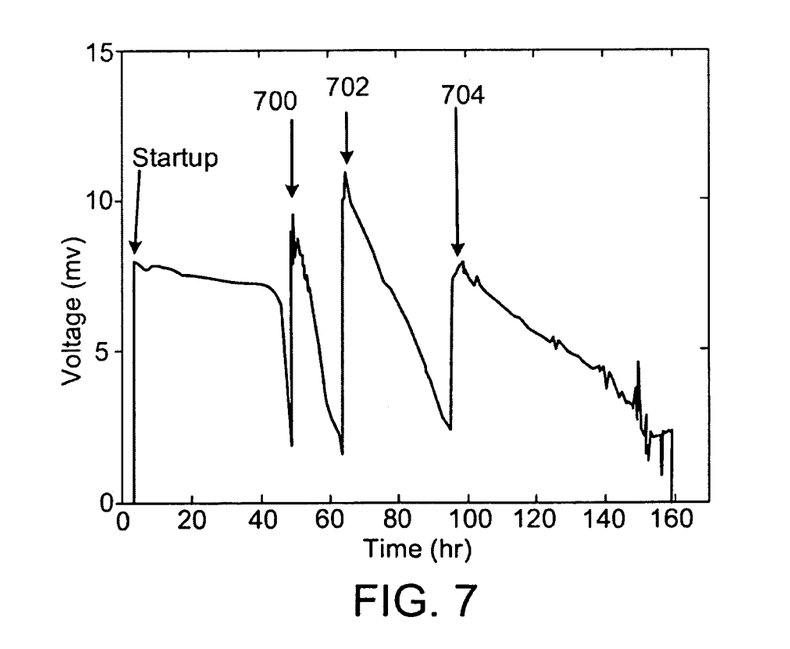
FIG. 7 shows voltage vs. time data for chromium reduction in a microbial fuel cell with Shewanella species as biocatalysts on both the anode and cathode.

A fuel cell utilizing S. oneidensis MR-1 as biocatalyst on both the anode and cathode electrodes was set up to utilize lactate as the electron donor in the anode compartment and fumarate as the electron acceptor in the cathode. Once fumarate was consumed, as indicated by a voltage drop) chromium spikes were introduced into the cathode compartment. As shown in FIG. 7, the MFC system exhibited voltage generation responses for each spike of concentrated Cr(VI) 700, 702, 704, indicating the occurrence of a reductive process at the cathode.

EXAMPLE 4

Figure 8:
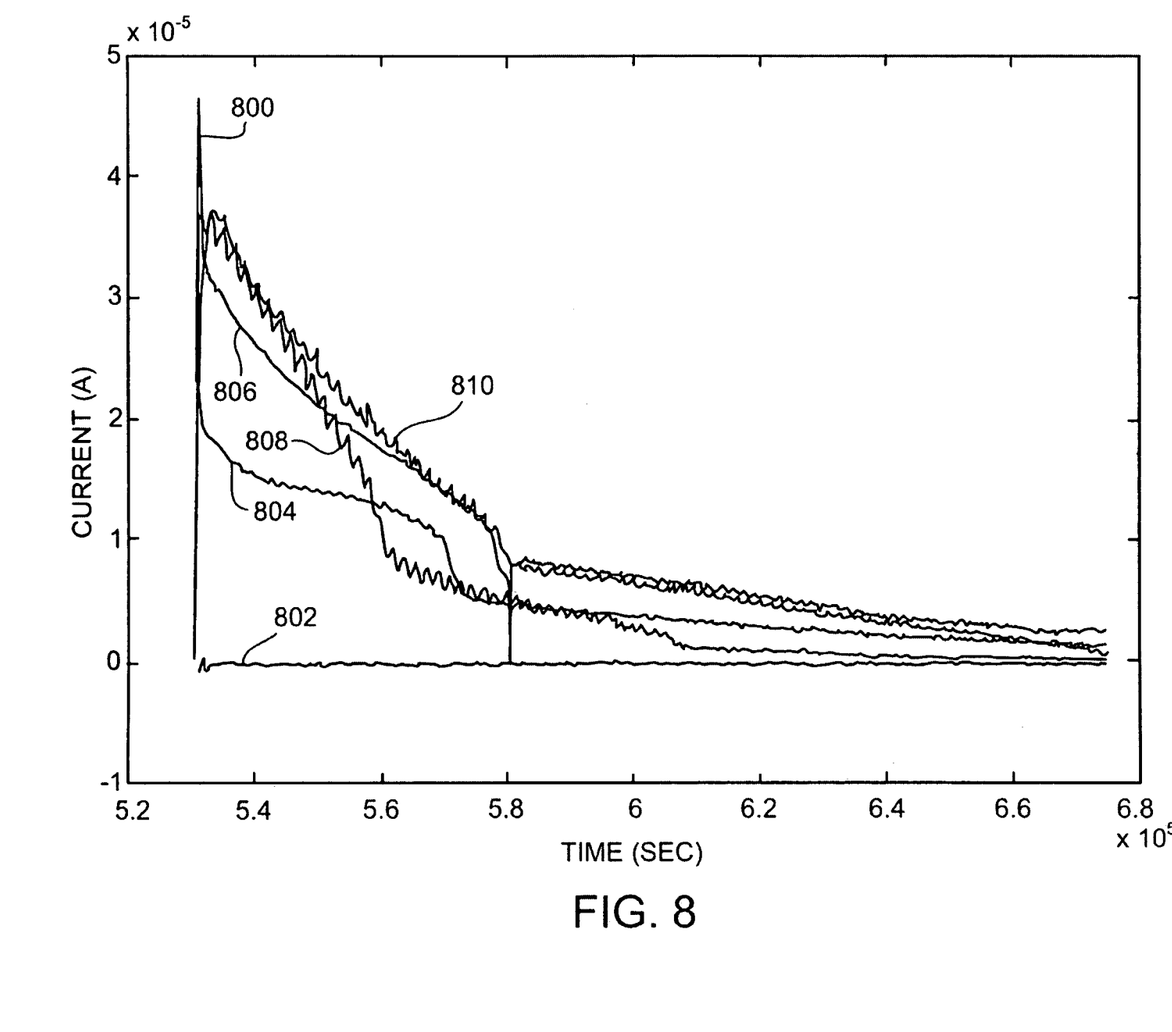
FIG. 8 shows current vs. time for chromium reduction in microbial fuel cells with Shewanella species as biocatalysts on one or both electrodes.

Fuel cells utilizing S. oneidensis MR-1 as biocatalyst on the cathode only, the anode only, and both the anode and cathode were set up to utilize lactate as the electron donor in the anode compartment and fumarate as the electron acceptor in the cathode. FIG. 8 shows current vs. time for one spike 800 Of concentrated Cr(VI) for MFCs with S. oneidensis MR-1 at the cathode 802, at the anode 804, and at the cathode and anode 806, 808, 810. No detectable current was generated with S. oneidensis MR-1 at the cathode only 802. While some current was generated with S. oneidensis MR-1 at the anode only 804, a greater initial response was seen with S. oneidensis MR-1 at both the cathode and anode 806, 808, 810.

A number of embodiments of the invention have been described. Nevertheless, it will be understood that various modifications may be made without departing from the spirit and scope of the invention. Accordingly, other embodiments are within the scope of the following claims.

What is claimed is:

1. A microbial fuel cell comprising:
   an anode compartment comprising an anode and an anode biocatalyst, wherein the anode biocatalyst catalyzes oxidation of an organic substance;
   a cathode compartment comprising a cathode and a cathode biocatalyst, wherein the cathode biocatalyst catalyzes reduction of a metal;
   a membrane positioned between the anode compartment and the cathode compartment; and
   an electrical pathway between the anode and the cathode, wherein the anode biocatalyst and the cathode biocatalyst are substantially the same, and the cathode biocatalyst is a metal-reducing bacteria.

2. The fuel cell of claim 1, wherein the anode compartment is substantially impermeable to the anode biocatalyst and the cathode compartment is substantially impermeable to the cathode biocatalyst.

3. The fuel cell of claim 1, wherein the cathode compartment is maintained under substantially anaerobic conditions.

4. The fuel cell of claim 1, wherein the cathode biocatalyst is oxygen-tolerant.

5. The fuel cell of claim 1, wherein the cathode biocatalyst is a species of *Shewanella*.

6. The fuel cell of claim 1, wherein the metal is a radionuclide.

7. The fuel cell of claim 1, wherein the metal is chromium (VI) and the cathode biocatalyst reduces chromium(VI) to chromium(III).

8. The fuel cell of claim 7, wherein the cathode biocatalyst reduces a concentration of chromium(VI) in the cathode compartment to less than about 1 ppb.

9. The fuel cell of claim 1, wherein the fuel cell is self-powered.

10. The fuel cell of claim 1, wherein the fuel cell is operable to generate electricity.

11. The fuel cell of claim 1, wherein the fuel cell is operable for in situ soil or water remediation.

12. The fuel cell of claim 11, wherein the fuel cell is operable in marine or freshwater environments.

13. The fuel cell of claim 1, wherein the membrane is substantially impermeable to the metal.

14. A microbial fuel cell comprising:
    an anode compartment comprising an anode and an anode biocatalyst, wherein the anode biocatalyst catalyzes oxidation of a metal;
    a cathode compartment comprising a cathode and a cathode biocatalyst, wherein the cathode biocatalyst catalyzes reduction of an organic or inorganic oxidant;
    a membrane positioned between the anode compartment and the cathode compartment; and
    an electrical pathway between the anode and the cathode, wherein the anode biocatalyst and the cathode biocatalyst are substantially the same, and the cathode biocatalyst is a metal-oxidizing bacteria.

15. The fuel cell of claim 14, wherein the membrane is substantially impermeable to the inorganic substance.

16. A method of generating electricity, the method comprising:
    positioning a microbial fuel cell in a location proximate a medium comprising an inorganic contaminant, the inorganic contaminant comprising a metal;
    providing the contaminated medium to the fuel cell;
    catalyzing oxidation of an organic substance with bacteria in the fuel cell;
    catalyzing reduction of the metal with bacteria in the fuel cell;
    forming a precipitate comprising the reduced metal; and
    substantially containing the precipitate in the fuel cell,
    wherein the bacteria catalyzing oxidation of the organic substance and the bacteria catalyzing reduction of the metal are substantially the same, and the bacteria catalyzing reduction of the metal is a metal-reducing bacteria.

17. The method of claim 16, wherein positioning the fuel cell in a location proximate the medium comprises placing the fuel cell in the medium.

18. The method of claim 16, wherein positioning the fuel cell in a location proximate the medium comprises placing the fuel cell outside of the medium.

19. The method of claim 16, wherein the medium comprises soil or water.

20. The method of claim 16, wherein providing the contaminant to the fuel cell comprises allowing the medium to diffuse toward the fuel cell.

21. The method of claim 16, wherein providing the contaminant to the fuel cell comprises transporting the medium toward the fuel cell.

22. The method of claim 16, further comprising reducing a concentration of the contaminant in the fuel cell to less than about 1 ppb.

23. The method of claim 16, further comprising reducing a concentration of the contaminant in the medium to less than about 1 ppb.

24. The method of claim 16, wherein substantially containing the precipitate in the fuel cell comprises inhibiting oxidation of the reduced contaminant.

25. The method of claim 16, further comprising substantially containing the bacteria in the fuel cell.

26. The method of claim 17, further comprising removing the fuel cell comprising the precipitate from the medium.

27. The method of claim 16, further comprising inhibiting oxidation of the reduced contaminant.

28. A method of generating electricity, the method comprising:
    positioning a microbial fuel cell in a location proximate a medium comprising an inorganic contaminant, the inorganic contaminant comprising a metal;
    providing the contaminated medium to the fuel cell;
    catalyzing reduction of an organic or inorganic oxidant with bacteria in the fuel cell;
    catalyzing oxidation of the metal with bacteria in the fuel cell to form an oxidized contaminant;
    electrokinetically assisting the contaminant toward the fuel cell;
    forming a precipitate comprising the oxidized metal; and
    substantially containing the precipitate in the fuel cell.

29. A microbial fuel cell comprising:
    an anode compartment comprising an anode and an anode biocatalyst, wherein the anode biocatalyst catalyzes oxidation of an organic substance;
    a cathode compartment comprising a cathode and a cathode biocatalyst, wherein the cathode biocatalyst catalyzes reduction of a semi-conductor;
    a membrane positioned between the anode compartment and the cathode compartment; and
    an electrical pathway between the anode and the cathode, wherein the anode biocatalyst and the cathode biocatalyst are substantially the same, and the cathode biocatalyst is a metal-reducing bacteria.

30. A method of generating electricity, the method comprising:
    positioning a microbial fuel cell in a location proximate a medium comprising an inorganic contaminant, the inorganic contaminant comprising a metal;
    electrokinetically assisting the contaminant toward the fuel cell;
    catalyzing oxidation of an organic substance with bacteria in the fuel cell;
    catalyzing reduction of the metal with bacteria in the fuel cell;
    forming a precipitate comprising the reduced metal; and
    substantially containing the precipitate in the fuel cell.

31. The method of claim 30, wherein positioning the fuel cell in a location proximate the medium comprises placing the fuel cell in the medium.

32. The method of claim 30, wherein the medium comprises soil or water.

33. The method of claim 30, further comprising reducing a concentration of the contaminant in the fuel cell to less than about 1 ppb.

34. The method of claim 30, further comprising reducing a concentration of the contaminant in the medium to less than about 1 ppb.

35. The method of claim 30, further comprising inhibiting oxidation of the reduced contaminant.

* * * * *